United States Patent [19]
Connolly et al.

[11] Patent Number: 6,070,217
[45] Date of Patent: *May 30, 2000

[54] HIGH DENSITY MEMORY MODULE WITH IN-LINE BUS SWITCHES BEING ENABLED IN RESPONSE TO READ/WRITE SELECTION STATE OF CONNECTED RAM BANKS TO IMPROVE DATA BUS PERFORMANCE

[75] Inventors: Brian J. Connolly, Williston; Bruce G. Hazelzet; Mark W. Kellogg, both of Essex Juntion, all of Vt.

[73] Assignee: International Business Machines Corporation, Armonk, N.Y.

[ * ] Notice: This patent is subject to a terminal disclaimer.

[21] Appl. No.: 09/076,265

[22] Filed: May 12, 1998

Related U.S. Application Data

[63] Continuation-in-part of application No. 08/676,609, Jul. 8, 1996, Pat. No. 5,802,395.

[51] Int. Cl.[7] .............................. G06F 13/00; G06F 13/40; G06F 12/00; G06F 12/06
[52] U.S. Cl. .............................. 710/131; 710/14; 710/15; 710/102; 710/104; 710/126; 711/2; 711/5; 711/115; 711/170
[58] Field of Search .................................... 710/102, 126, 710/131, 14, 11, 15, 10, 104; 711/170, 5, 115, 2, 147; 395/282, 306, 311, 834, 835, 831, 830, 284

[56] References Cited

U.S. PATENT DOCUMENTS

| | | |
|---|---|---|
| 4,441,036 | 4/1984 | Oldham . |
| 4,596,004 | 6/1986 | Kaufman . |
| 4,903,197 | 2/1990 | Wallace et al. .......................... 364/200 |
| 4,984,197 | 1/1991 | Sakagami . |
| 5,140,550 | 8/1992 | Miyaoka et al. . |
| 5,167,028 | 11/1992 | Shires ..................................... 395/425 |
| 5,170,252 | 12/1992 | Gear et al. . |
| 5,214,570 | 5/1993 | Shah et al. . |
| 5,241,643 | 8/1993 | Durkin et al. . |
| 5,260,892 | 11/1993 | Testa . |
| 5,272,664 | 12/1993 | Alexander et al. . |
| 5,283,877 | 2/1994 | Gastinel et al. ......................... 395/425 |
| 5,319,595 | 6/1994 | Saruwatari . |
| 5,357,621 | 10/1994 | Cox . |
| 5,375,084 | 12/1994 | Begun et al. . |
| 5,430,686 | 7/1995 | Tokami et al. . |
| 5,446,621 | 8/1995 | Jansen et al. . |
| 5,463,577 | 10/1995 | Oowaki et al. . |
| 5,465,229 | 11/1995 | Bechtolsheim et al. . |
| 5,499,215 | 3/1996 | Hatta . |
| 5,513,135 | 4/1996 | Dell et al. . |
| 5,652,721 | 7/1997 | McIntrye . |
| 5,802,395 | 9/1998 | Connolly et al. ........................ 395/834 |
| 5,862,320 | 1/1999 | Nelsen et al. ...................... 395/183.18 |
| 5,926,827 | 7/1999 | Dell et al. ............................... 711/105 |

Primary Examiner—Thomas C. Lee
Assistant Examiner—Tanh Nguyen
Attorney, Agent, or Firm—Whitman, Curtis & Whitham; Robert A. Walsh, Esq.

[57] ABSTRACT

Data line loading on high density modules with multiple DRAMs is minimized permitting the maximum memory density of systems of otherwise limited density to be increased without an ensuing performance degradation due to data line capacitive loading. First the single or dual in-line memory module (SIMM or DIMM) includes in-line bus switches. The bus switches are between the SIMM or DIMM module tabs (system) and random access memory devices (RAM) and are either in a high impedance (off) or active state depending on the READ/WRITE state of the RAM. When in the high impedance state, the effective loading of the module is that of the bit switch device. The logic for determining the READ/WRITE state may be embedded in an application specific integrated circuit (ASIC) that monitors bus activity and controls activation of the bus switches, be provided by a memory controller or, generated by the RAM itself. The bus switches are active when the RAM is performing a read or a write and inactive otherwise. The RAM is Fast Page Mode (FPM) and Extended Data Output (EDO) or Synchronous DRAM (SDRAM).

3 Claims, 7 Drawing Sheets

HIGH DENSITY MEMORY MODULE WITH IN-LINE BUS SWITCHES BEING ENABLED IN RESPONSE TO READ/WRITE SELECTION STATE OF CONNECTED RAM BANKS TO IMPROVE DATA BUS PERFORMANCE

RELATED APPLICATION

The present invention is a continuation in part of U.S. Patent application Ser. No. 08/676,609 entitled "High Density Memory Modules With Improved Data Bus Performance" to Connolly et al., filed Jul. 8, 1996, now U.S. Pat. No. 5,802,395, assigned to the assignee of the present application, now U.S. Pat. No. 5,802,395.

BACKGROUND OF THE INVENTION

1. Field of the Invention

The present invention generally relates to high density memory modules for computers and, more particularly, to multiple bank memory modules having minimal memory bus loading.

2. Background Description

High density memory modules, e.g., single in-line memory modules (SIMMS) and dual in-line memory modules (DIMMs), continue to be in demand for high end personal computers (PCS), network servers and workstations, as added system performance can be achieved in many applications. However, the maximum system density often is artificially limited by one or more of the following:

The system has a limited number of memory module "slots".
The system has a limited number of memory "banks" (due to a lack of select lines from the memory controller).
High density memory chips (e.g., 64 megabit (Mb), 256 Mb and greater) are either very expensive and/or not readily available.
High density memory chips may have an operating voltage which is lower than the system memory interface voltage.
The use of stacking/cubing or oversize modules (with standard random access memory (RAMs) devices including dynamic RAMs (DRAMs), synchronous DRAMs (SDRAMs) and static RAMs (SRAMs)) results in a data line capacitance well beyond system limits.

Previous solutions have been provided for all but the last of the above problems, but these solutions have been limited in applicability due to data line loading concerns. What is needed in order to better utilize less expensive RAM chips in systems with otherwise limited memory expansion is a way to minimize data line capacitance loading so that oversize memory modules with banks of RAM chips can be added to the system.

SUMMARY OF THE INVENTION

It is therefore an object of the present invention to minimize data line loading on high density modules with multiple random access memory devices per data line.

It is another object of the invention to maximize memory density of systems of otherwise limited density without an ensuing performance degradation due to data line capacitive loading.

The present invention is a two part solution to reducing data line capacitance to an acceptable system limit. The first part is a memory module, e.g., single in-line memory module (SIMM) or a dual in-line memory module (DIMM), with in-line bus switches. The bus switches are placed between the module tabs (system) and random access memory devices (RAMs), preferably synchronous Dynamic RAMs (SDRAMs), and are either in a high impedance (off) or active state. When in the high impedance state, the effective loading of the memory module is that of the bit switch device. When memory is active (e.g., read/write cycle), only the active module adds a minimal capacitance/resistance to the memory bus, in addition to the RAM loading. Only one module is active at a time.

In addition, these switches further extend the overall memory subsystem's operating frequency by reducing the effective data line (DQ net) 'stub' length, which would otherwise be present from all memory modules in the system—both active (i.e., driving/receiving data) and inactive. This reduction in 'stub' length significantly reduces signal reflections on the data bus, both in number and amplitude. This is especially true for modules with a large number of devices, which would normally have correspondingly longer data nets.

The second part of the solution according to the invention is logic generating a signal that enables the bus switches. This logic may be in an application specific integrated circuit (ASIC), provided from a memory controller or, generated by the RAM chips themselves. The bus switches become active depending on the READ/WRITE state of the RAM. Thus, for Fast Page Mode (FPM) and Extended Data Output (EDO) RAM, the falling edge of any RAS select line to the memory module initiates the READ/WRITE state and the latter of the RAS or column address strobe (CAS) select lines going inactive terminates the READ/WRITE state. In one preferred embodiment, an ASIC performs this task by decoding the system's RAS and CAS select lines and driving a signal to enable the bus switches.

In another preferred embodiment, this decode function is provided by logic on the memory module, and especially for SDRAMs by the SDRAM, to permit these modules (DIMMs) to be fully interchangeable with industry standard memory modules, and to limit the number of module and system memory controller pins required.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention will be described in terms of a specific implementation using dual in-line memory modules (DIMMs); however, those skilled in the art will recognize that other memory modules, such as single in-line memory modules (SIMMs), can be used in the practice of the invention. Such modules are typically implemented as a printed circuit card with tabs for insertion in a connector on a computer system board.

Figure 1:
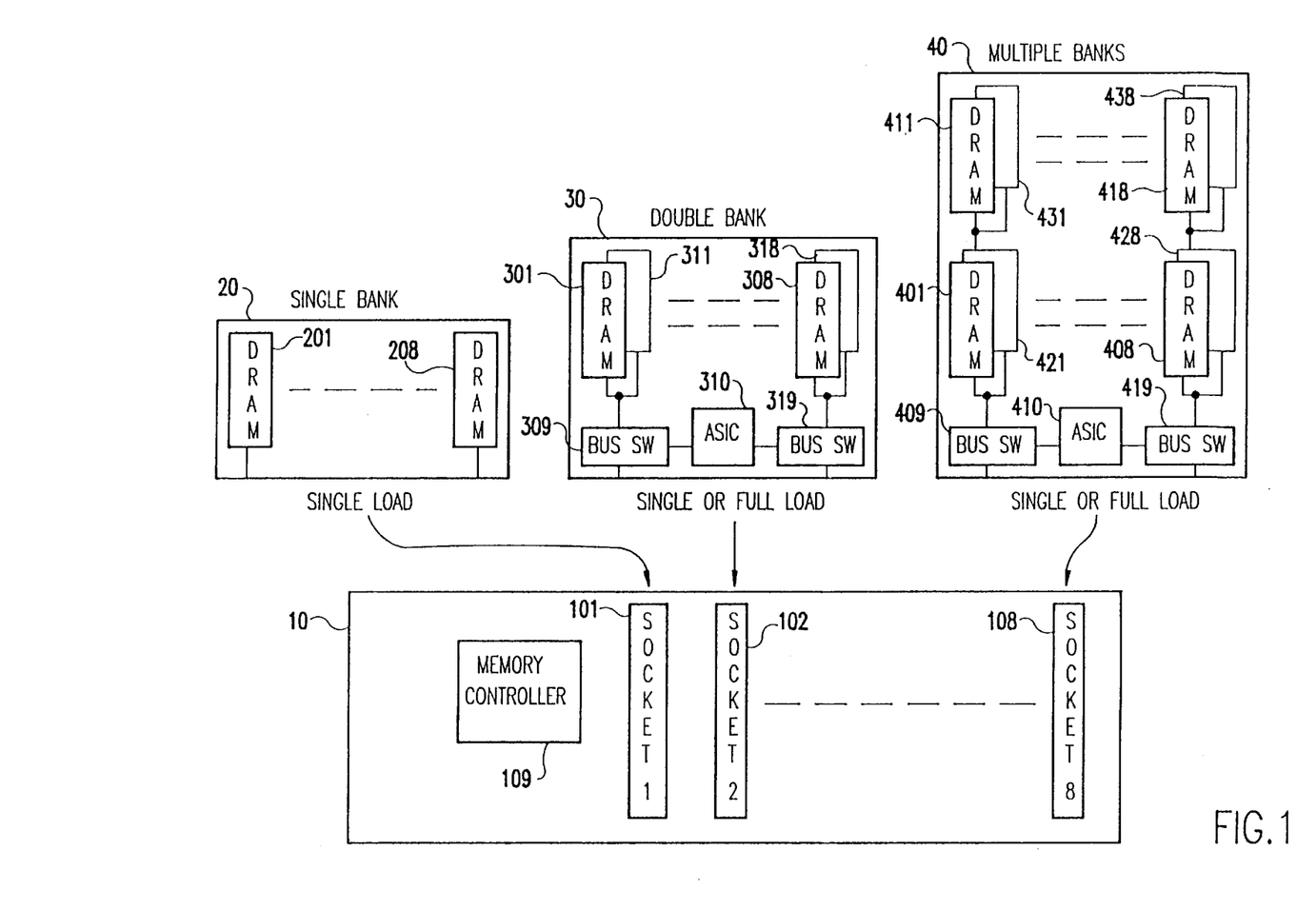
FIG. 1 is block diagram illustrating a system memory board and both conventional single bank DIMM and multiple bank DIMMs according to the invention.

Referring now to the drawings, and more particularly to FIG. 1, there is shown a typical system board 10 with eight memory module sockets 101 to 108 and a memory controller 109. A conventional single bank DIMM 20 having, for example, eight 4 megabit (Mb) dynamic random access memory (DRAM) chips 201 to 208 may be plugged into any one of the sockets 101 to 108, usually beginning with socket 101 closest to the memory controller 109 and continuing in order until all the sockets 101 to 108 have a DIMM 20 inserted. Thus, for this example, the system board has a minimum configuration of 4 megabyte (MB) and a maximum configuration of 32 MB. The DRAM chips may be Fast Page Mode (FPM) DRAM, Extended Data Output (EDO) DRAM or Synchronous DRAM (SDRAM).

According to a first preferred embodiment of the invention, a double bank DIMM or multiple bank DIMM 40 may be substituted for the single bank DIMM 20. In the case of the double bank DIMM 30, there are a first group of eight DRAM chips 301 to 308 connected to bus switches 309 and 319, in addition to a second group of eight DRAM chips 311 to 318. The two bus switches are, in turn, connected to an ASIC 310, which is connected to the RAS and CAS pins of the module. This concept is expanded in the case of the multiple bank DIMM 40 where, in this example, there are four groups of DRAM chips 401 to 408, 411 to 418, 421 to 428, and 431 to 438. DRAM chips 401 to 404, 421 to 424, 411 to 414, and 431 to 434 connect to bus switch 409, and DRAM chips 405 to 408, 425 to 428, 415 to 418, and 435 to 438 connect to bus switch 419. As in the double bank DIMM 30, the bus switches 409 and 419 are connected to ASIC 410 which is connected to the RAS and CAS pins of the module.

Using the double bank DIMMs 30, the minimum configuration of the system is increased to 8 MB, and the maximum configuration is increased to 64 MB. Using the multiple bank DIMMs 40, for the example of four banks of DRAM chips shown, the minimum configuration of the system is increased to 16 MB, and the maximum configuration is increased to 128 MB. Use of higher density devices (e.g., 16 Mb, 64 Mb, 256 Mb, etc.) would result in significant increases in maximum memory density. This is accomplished with minimum data bus loading as indicated in the table below:

| DATA Bus LOADING COMPARISON* (maximum) | | | |
|---|---|---|---|
| | 1 Bank | 2 Banks | 4 Banks |
| Traditional | 8 | 16 | 32 |
| Invention | 8 | 9 | 11 |

*expressed as number of DRAM-equivalent loads/DIMM (typically 7 picofarads per DRAM)

This reduction is the result of using bus switches 309 and 319, in the case of the double bank DIMM 30, and bus switches 409 and 419, in the case of the multiple bank DIMM 40. The ASICs 310 and 410 provide the interface between the bus switches and the system board.

Figure 2:
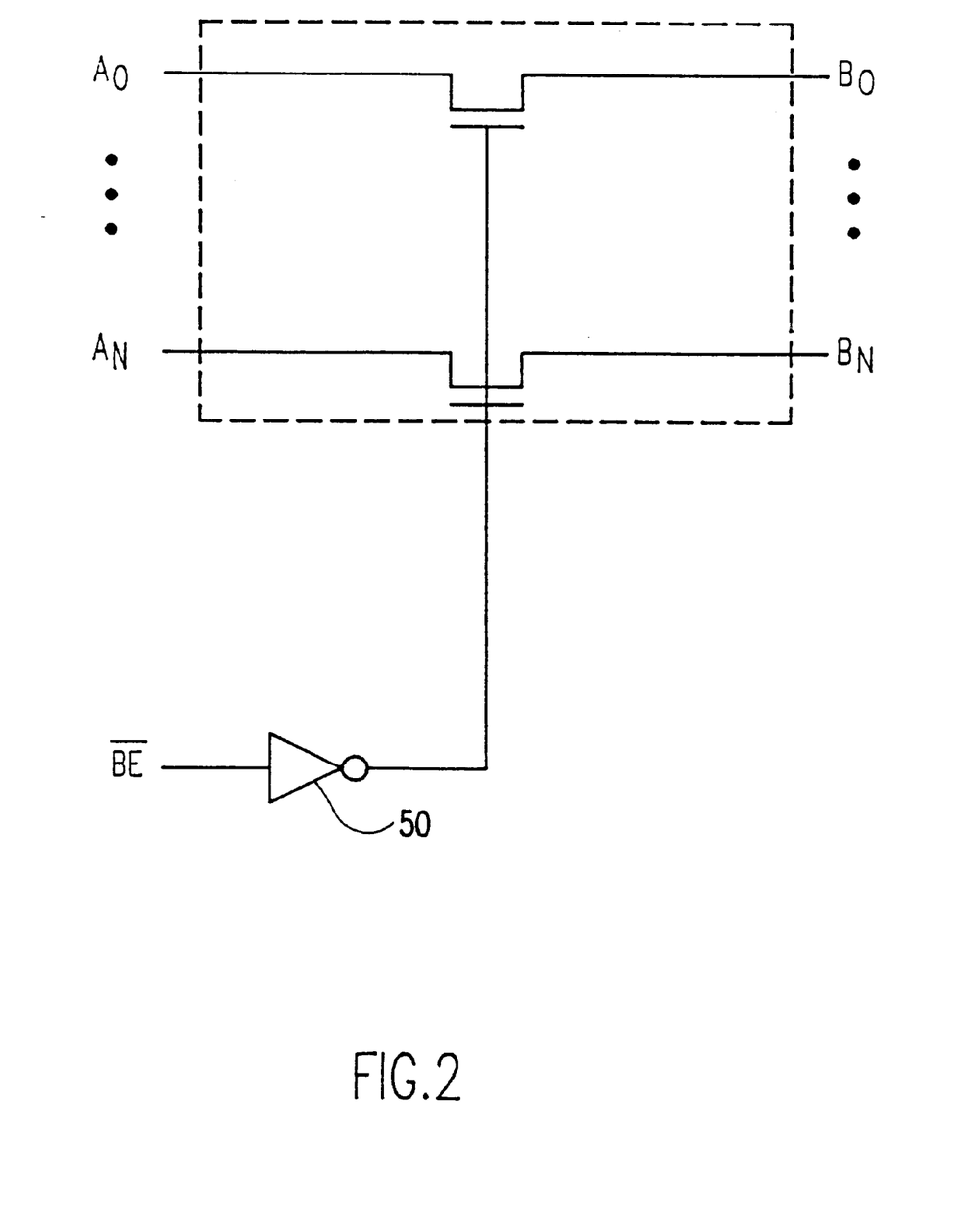
FIG. 2 is a generalized block and logic diagram of the bus switches used in the implementations of the invention shown in FIG. 1.

Turning now to FIG. 2, there is shown a generalized logic diagram for the bus switches. The bus switches comprise a plurality of FETs, one for each line. One or more invertors 50 are used to bias the FETs on. The input $\overline{BE}$ to the inverter 50 is the enable input for the bus switch. When the enable input goes low, the output of the inverter goes high so that a positive bias is applied to the gates of the FETs causing them to conduct. The delay through these bus switches is less than one nanosecond (1 ns), which ensures proper memory operation.

Figure 3:
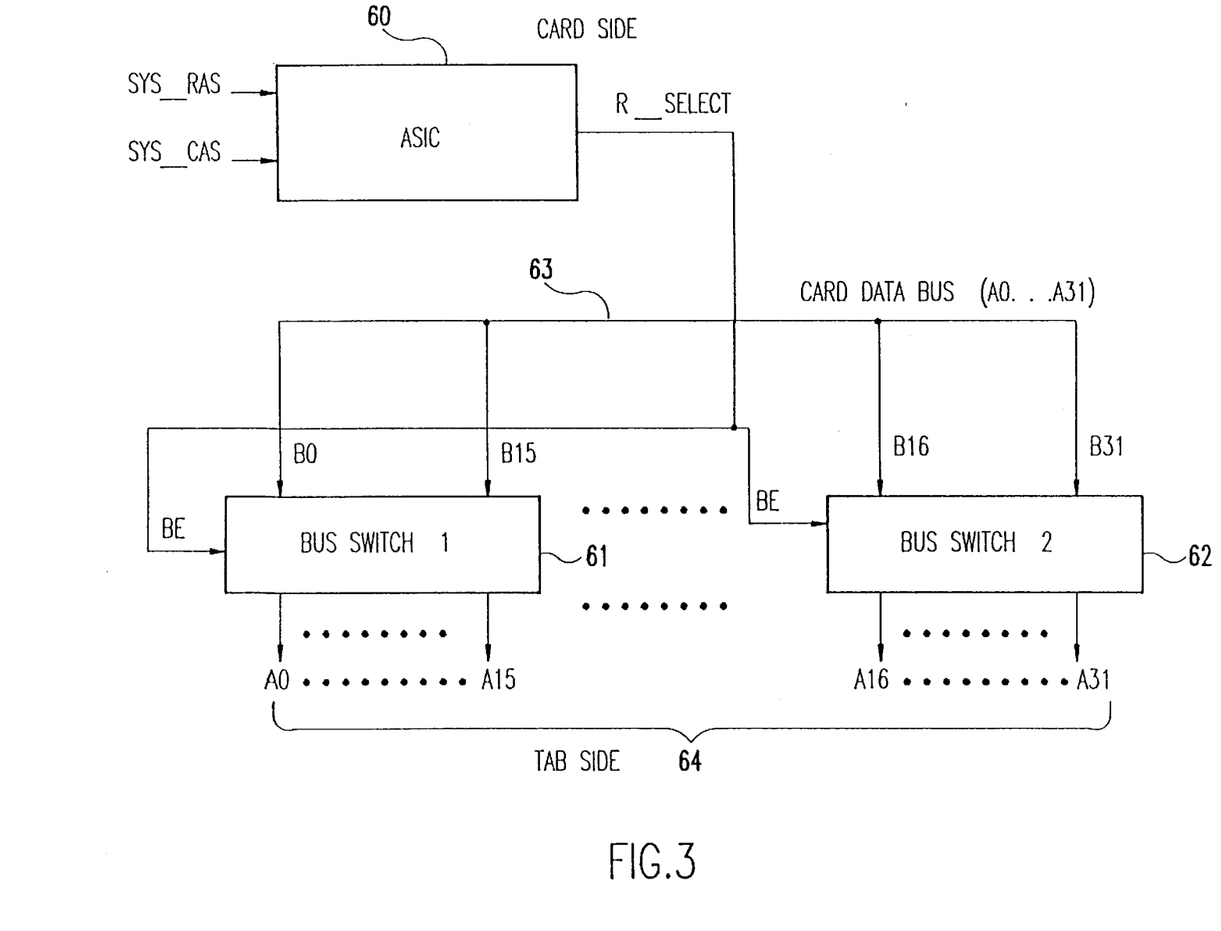
FIG. 3 is a block diagram showing the relationship of the ASIC and the bus switches in the implementations of FIG. 1.

As shown in the block diagram of FIG. 3, the ASIC 60 (corresponding to ASICs 310 and 410 of FIG. 1) receives the system's RAS and CAS signals, determines the READ/WRITE state of the memory from the RAS and CAS signals and generates therefrom, an RC_SELECT signal to the enable inputs of bus switches 61 and 62. The bus switches 61 and 62 provide the interface between the card data bus 63 and the tabs 64 of the printed circuit card.

Figure 4A:
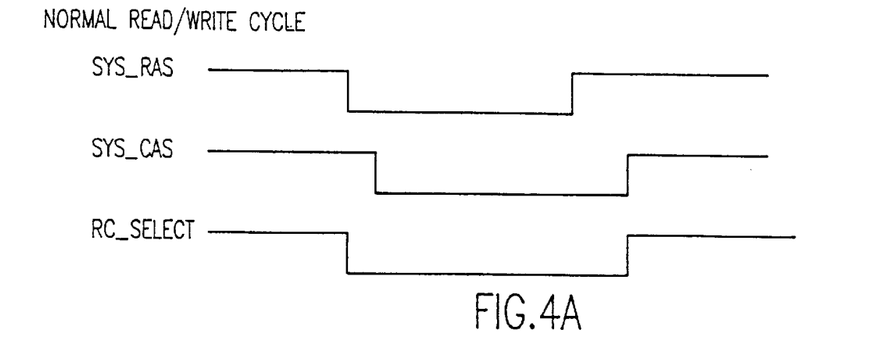
FIGS. 4A, 4B, 4C, and 4D are timing diagrams respectively illustrating the operation of the ASIC logic in generating the RC_SELECT output signal for the normal read/write cycle, the RAS only refresh cycle (ROR), the CAS before RAS refresh cycle (CBR), and the hidden refresh cycle.

The RC_SELECT signal is an active low signal and has a unique function. During normal memory read and write cycles, the RC_SELECT signal is activated on the active (falling) edge of the system's RAS select line and stays active until both the system's RAS and CAS select lines are inactive, as shown in FIG. 4A.

Figure 4B:
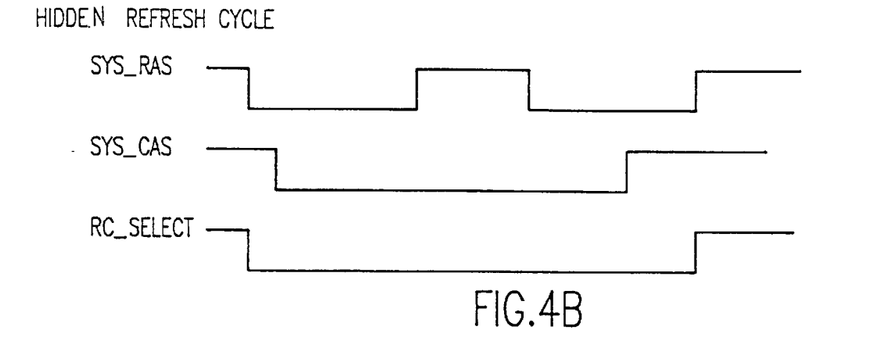

During a HIDDEN REFRESH cycle, the RC_SELECT signal is active due to the nature of a HIDDEN REFRESH cycle, as shown in FIG. 4B. The first part of a HIDDEN REFRESH cycle is a memory cycle whereby the system's CAS select line remains active until RAS rises then falls (initiating a CBR refresh cycle). The RC_SELECT logic filters CAS disturbances and remains inactive.

Figure 4C:
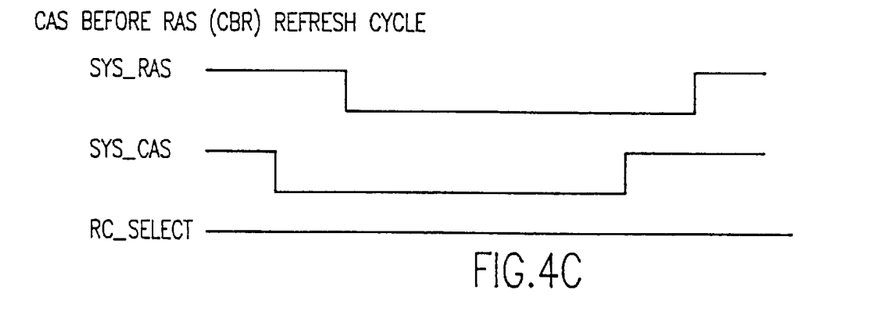

During a CBR refresh, the system's CAS select lines are active prior to the system's RAS select lines becoming active, as shown in FIG. 4C. The RC_SELECT signal remains inactive during CBR cycles.

Figure 4D:
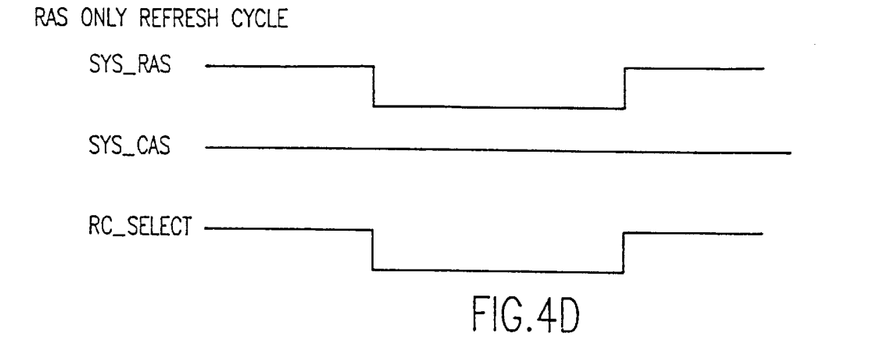

During RAS ONLY REFRESH (ROR) cycles, the system RAS select line is active, and driven onto the RC_SELECT signal, as shown in FIG. 4D. Activation of the bus switches has no effect on system operation since data is not being driven at that time.

Additional circuitry can be added to prevent activation during ROR cycles if needed in a given application.

Figure 5:
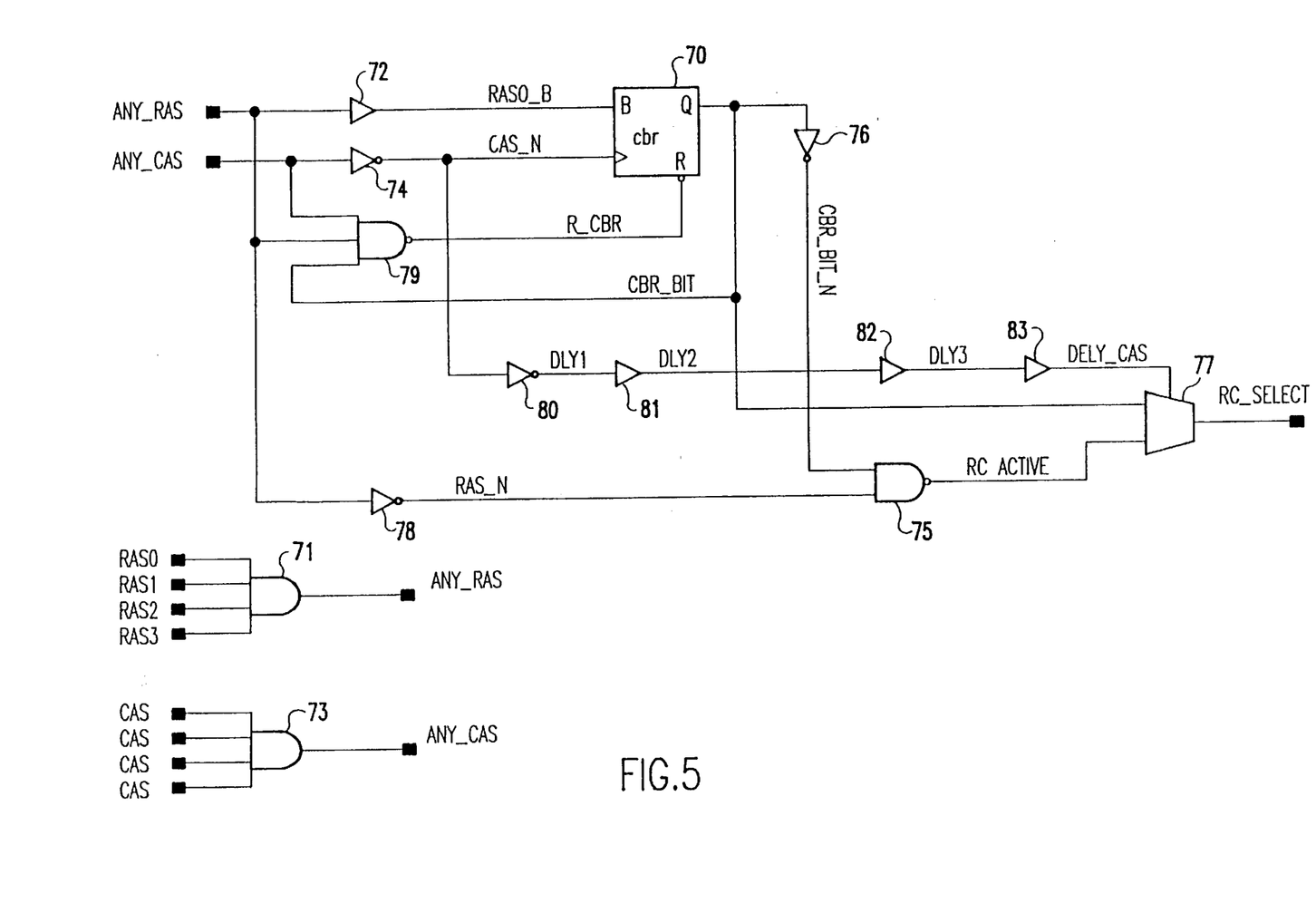
FIG. 5 is a block and logic diagram showing the logic of the ASIC according to a preferred embodiment of the invention.

The internal logic of the ASIC contains a D-type flip-flop 70 that latches the state of the system RAS select lines (ANY_RAS) on the active (i.e., falling) edge of the system's CAS select lines (ANY_CAS). The ANY_RAS signal is generated by AND gate 71 and supplied to the D input of flip-flop 70 via buffer 72, while the ANY_CAS signal is generated by AND gate 73 and supplied to the clock input of flip-flop 70 via inverter 74. The output of the flip-flop 70 is connected to a two input NAND gate 75 via an inverter 76 and also to multiplexer 77 on input "0". The output of the inverter 76 is signal CBR_BIT_N. The signal ANY_RAS is inverted by inverter 78, the output of which is connected to the other input of the two input NAND gate 75. The output of NAND gate 75 is the signal RC_ACTIVE and is connected to input "1" of multiplexer 77. The flip-flop 70 is reset by the output of NAND gate 79 when the system's RAS and CAS select lines are inactive and the "Q" output of the flip-flop 70 is a logical "1". The select line of multiplexer 77 is selected by the system's CAS select line delayed by four gates (inverter 80 and three buffers 81 to 83). This is to allow time for the flip-flop 70 to latch the state of the signal ANY_RAS.

At the initial start of each cycle, the multiplexer 77 is set to the "1" input position. This allows the system's RAS select lines to flush through quickly. When the system's CAS select lines become active, the multiplexer 77 switches over to the "0"input position, which selects the output of the flip-flop 70.

Figure 6A:
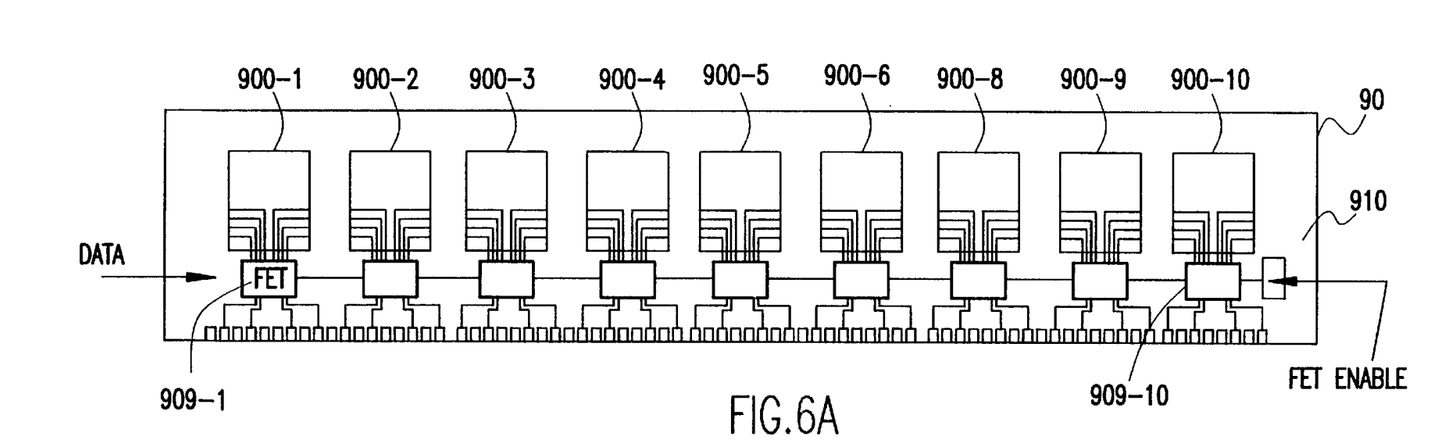
FIGS. 6A, 6B, and 6C show preferred embodiment multiple bank DIMMs suitable for SDRAMs.

Referring to FIG. 6A, which shows the above first preferred embodiment DIMM 90 corresponding to modules 30 and 40 in FIG. 1 DRAMs 900-1 to 900-10, preferably SDRAMs, are coupled through bit switches 909-1 to 909-10 as controlled by ASIC 910 (corresponding to ASICs 310 and 410 of FIG. 1). ASIC 910 determines whether the SDRAM 900-1 to 900-10 on the DIMM 90 is in a READ/WRITE state or the bit switches 909-1 to 909-10 should remain inactive.

Figure 6B:
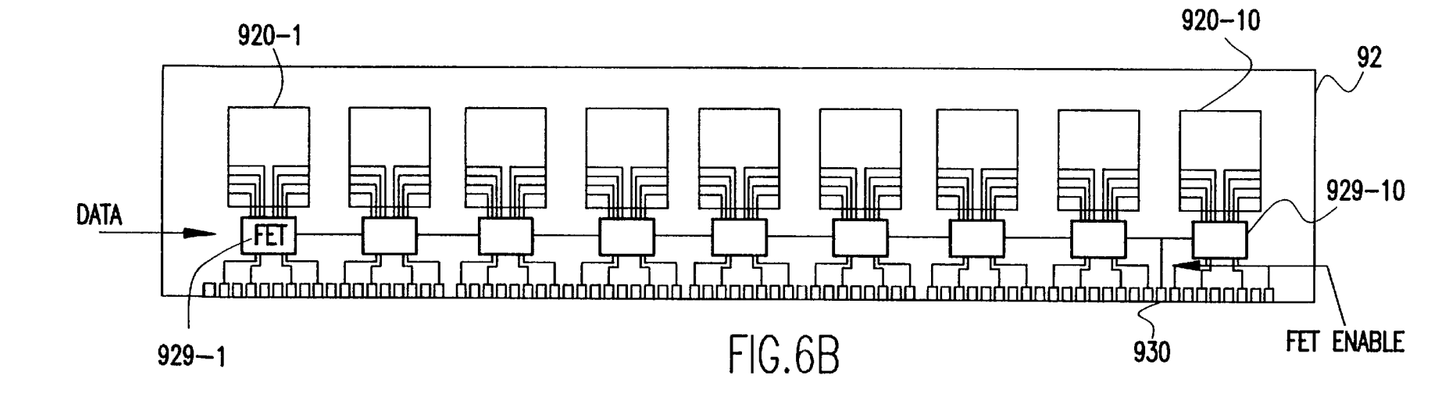

In FIG. 6B, which shows a second preferred embodiment DIMM 92, the banks of DRAM chips 920-1 to 920-10, preferably SDRAMs, are mounted on the DIMM and controlled by logic from a controller card, which may include an ASIC with the control signal provided to the bus switches 929-1 to 929-10 on line 930. Instead of an ASIC, a memory controller or other logic determines whether the SDRAM 920-1 to 920-10 on the DIMM 92 is in a READ/WRITE state or the bit switches 929-1 to 929-10 should remain inactive and passes a control signal on line 930 effecting that result.

Figure 6C:
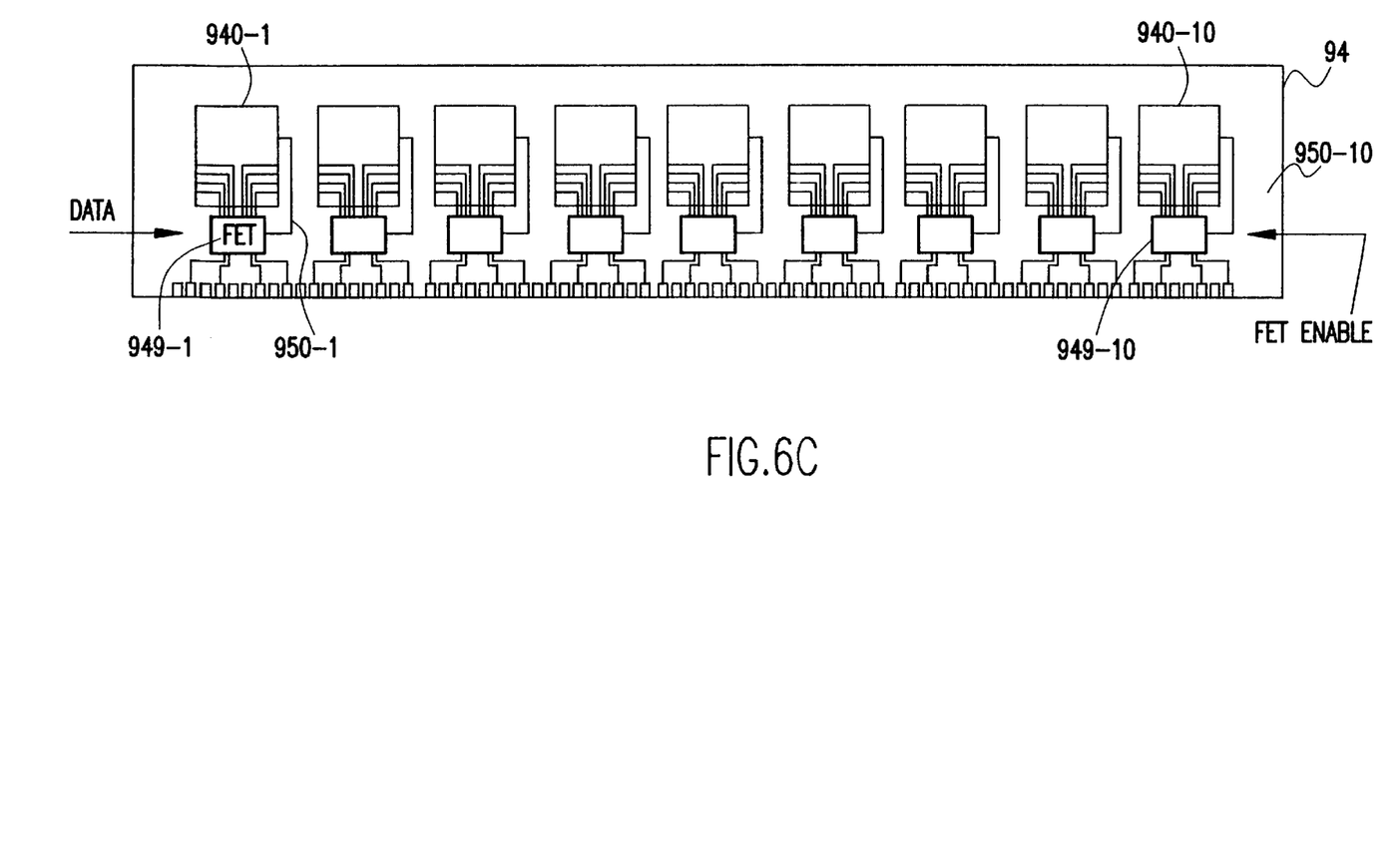

In FIG. 6C, which shows a third preferred embodiment DIMM 94, the banks of DRAM chips 940-1 to 940-10, preferably SDRAMs, are mounted on the DIMM and controlled by a signal indicating READ/WRITE state of each of the SDRAM chips 940-1 to 940-10 passed to bus switches 949-1 to 949-10 on lines 950-1 to 950-10, respectively. The SDRAM 940-1 to 940-10 on the DIMM 94 itself determines whether it is in a READ/WRITE state or the bit switches 929-1 to 929-10 should remain inactive and passes the control signal on lines 950-1 to 950-10, each SDRAM 940-1 to 940-10 controlling its respective bit switch 929-1 to 929-10.

While the invention has been described in terms of preferred embodiments, those skilled in the art will recognize that the invention can be practiced with modification within the spirit and scope of the appended claims.

We claim:

1. A high density memory module with improved data bus performance comprising:

a printed circuit card having tabs which interconnect with a connector on a system board, said printed circuit card having a card data bus;

two or more banks of random access memory devices mounted on said printed circuit card and connected to said card data bus; and at least two bus switches, selected ones of the random access memory devices of said two or more banks being connected to said at least two bus switches via said card data bus, said bus switches being enabled responsive to a READ/WRITE selection state of said connected two or more banks.

2. The high density memory module recited in claim 1 wherein said random access memory is synchronous dynamic random access memory (SDRAM).

3. The high density memory module recited in claim 2, wherein each said SDRAM bank provides a signal indicating a READ/WRITE state, said READ/WRITE state of all said SDRAM banks being combined to generate a signal for enabling said bus switches.

* * * * *